July 7, 1942.   S. H. BERCH   2,288,603
PACKAGING MEANS
Filed June 13, 1939   9 Sheets-Sheet 1

INVENTOR
SAMUEL H. BERCH
BY
James M. Abbott
ATTORNEY

July 7, 1942.

S. H. BERCH 2,288,603

PACKAGING MEANS

Filed June 13, 1939

INVENTOR
SAMUEL H. BERCH
BY
James M. Abbott
ATTORNEY

July 7, 1942.　　　S. H. BERCH　　　2,288,603
PACKAGING MEANS
Filed June 13, 1939　　　9 Sheets-Sheet 4

INVENTOR
SAMUEL H. BERCH
BY
James W. Abbott
ATTORNEY

July 7, 1942.                S. H. BERCH                2,288,603
                           PACKAGING MEANS
                     Filed June 13, 1939         9 Sheets-Sheet 5

INVENTOR
SAMUEL H. BERCH
BY
James M. Abbott
ATTORNEY

July 7, 1942. S. H. BERCH 2,288,603
PACKAGING MEANS
Filed June 13, 1939 9 Sheets-Sheet 6
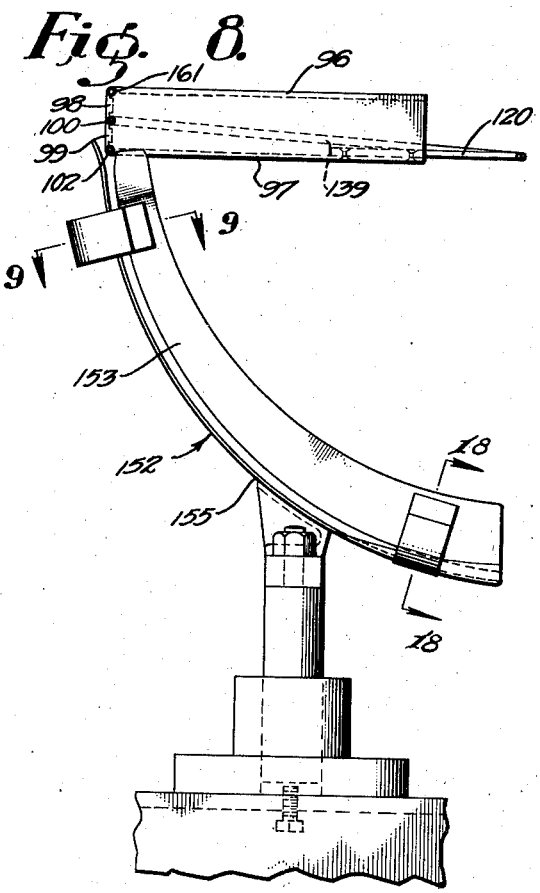
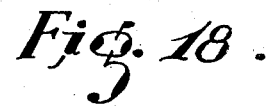
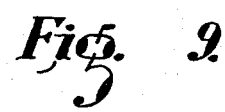
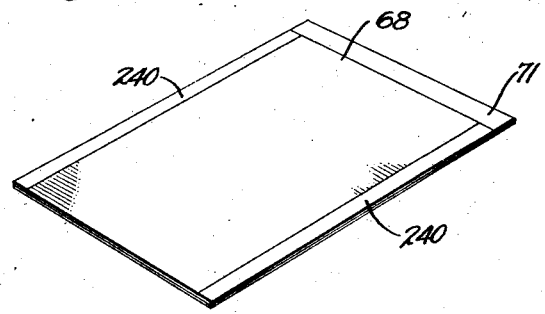
INVENTOR
SAMUEL H. BERCH
BY
James M. Abbott
ATTORNEY

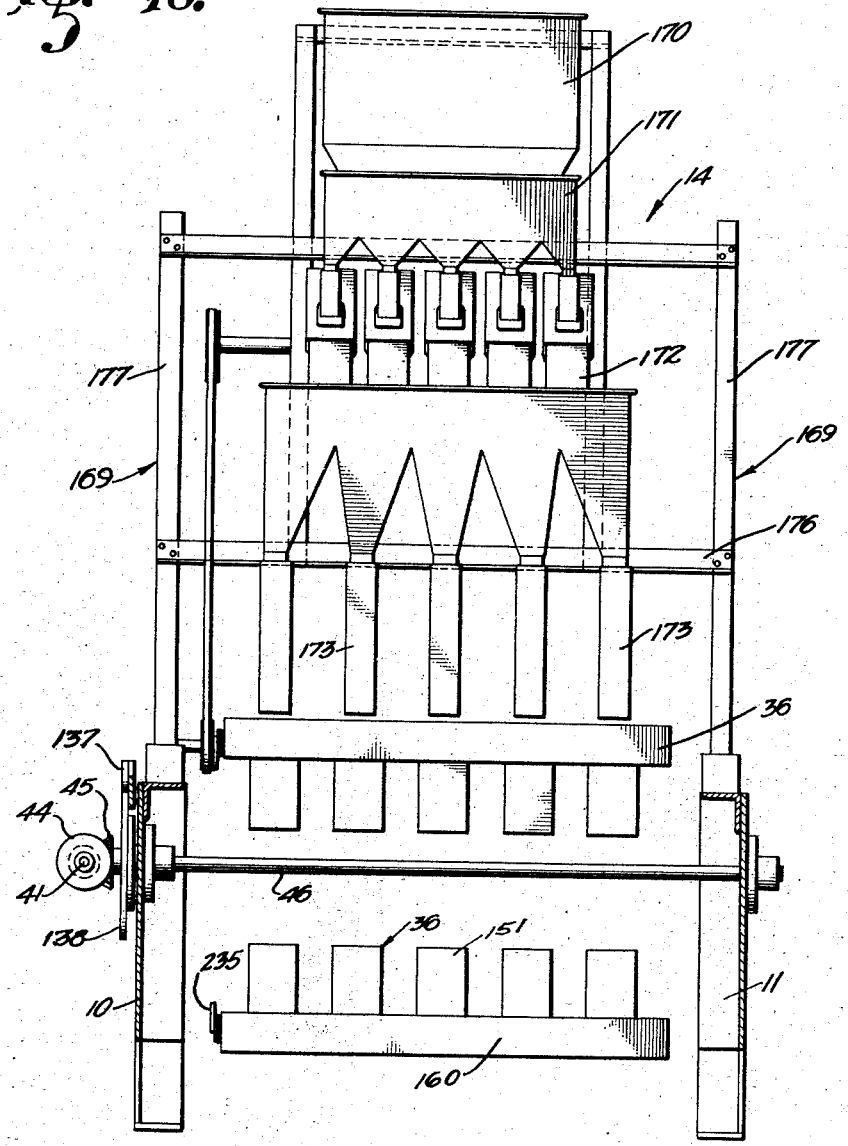

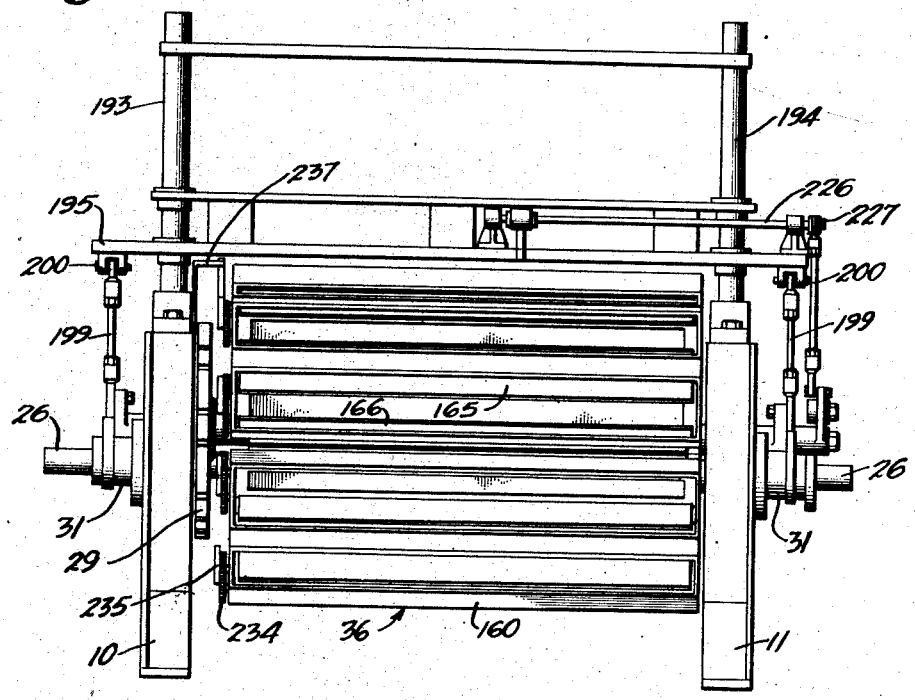
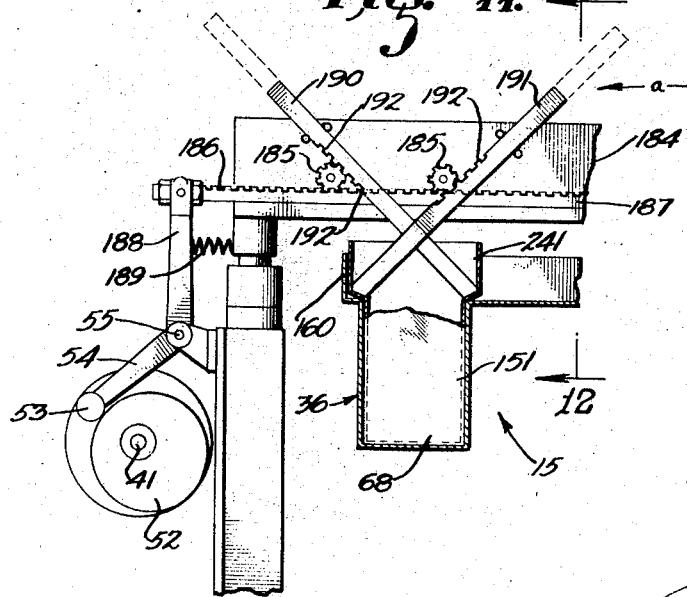
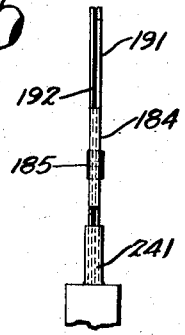

Patented July 7, 1942

2,288,603

UNITED STATES PATENT OFFICE 2,288,603

PACKAGING MEANS

Samuel H. Berch, Beverly Hills, Calif.

Application June 13, 1939, Serial No. 279,150

5 Claims. (Cl. 93—6)

This invention relates to the packaging of food and the like and particularly pertains to a method and means of packaging and vacuum sealing products.

In the packaging of food products in containers which have been made from laminated materials in the manner disclosed in my co-pending applications entitled "Laminated products and method and apparatus for making the same," Serial No. 226,119, filed April 5, 1939, and "Laminated product and method of making the same," Serial No. 266,873, filed April 8, 1939, and from which product a package is made as disclosed in my issued patent entitled "Method and means of packaging food products and the like," Patent No. 2,102,716, issued December 21, 1937, it is desirable to provide automatic means for handling the packages and filling and sealing the same under vacuum. It is the principal object of the present invention, therefore, to provide a method and apparatus within which the previously formed flexible containers are placed and by which apparatus the containers are opened, formed into package shape, conveyed to filling means, where they are automatically filled and after which they are conveyed to means for vacuumizing the container and the contents therein, and closing and sealing the package, the entire method and apparatus operating in full automatic action to receive the collapsed packages at one point in the machine and to deliver vacuum-sealed perfectly formed packages from another point in the machine, all of which action takes place in a simple and direct manner and makes it possible to obtain the product from the machine in large quantities and in properly formed and sealed packages.

The present invention contemplates the provision of a supply station at which previously formed collapsed flexible packages are stacked and from which they are removed individually and consecutively as they are opened. The invention contemplates the provision of the transfer of the opened containers to molds which carry the containers consecutively to a filling station and to a combined vacuumizing and sealing station from which the sealed packages are delivered to a discharge apparatus.

The invention is illustrated by way of example in the accompanying drawings, in which:

Fig. 8 is an enlarged view in side elevation showing the folding guides and their relation to the expanding means.

Fig. 9 is a view in transverse section through one of the folding guides as seen on the line 9—9 of Fig. 8 showing the method in which the folding guides and expander cooperate to form the container.

Fig. 10 is a view in vertical section on the line 10—10 of Fig. 1 showing the package feed station.

Fig. 11 is a view on the line 11—11 of Fig. 1 showing the means for spreading the mouth of the container prior to the closing operation, as seen in vertical section and elevation.

Fig. 12 is a view in transverse section through the spreading mechanism as seen on the line 12—12 of Fig. 11.

Fig. 15 is a view in end elevation showing the discharge end of the machine.

Fig. 16 is a view in perspective showing the container in its initial condition and reversed in position from that which it assumes in the magazines.

Fig. 17 is a view in perspective showing the package in its final form.

Fig. 18 is a view in transverse section through the folding guide as seen on the line 18—18 of Fig. 8.

Figure 1:
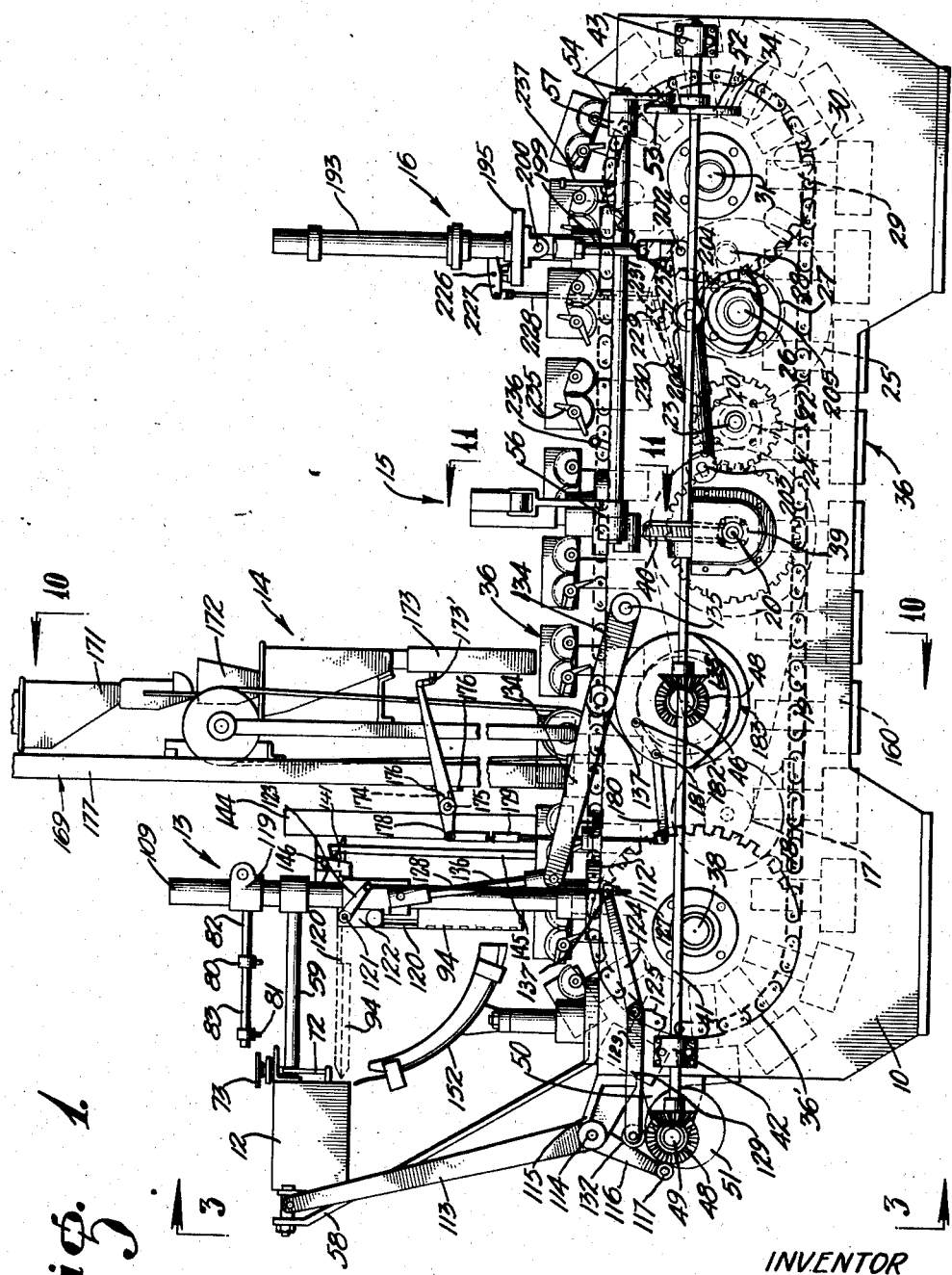
Figure 1 is a view in side elevation showing a complete assembly of the machine.

Referring more particularly to the drawings, 10 and 11 indicate the vertical base plate frame elements. Carried by the sub frame comprising the base plates 10 and 11 is a magazine unit 12, an expanding and forming unit 13, a container filling unit 14, a container spreading unit 15 and a vacuum sealing unit 16. The units are automatically driven in synchronism from a motor 17 which is fitted with a pulley 18 driving a belt or series of belts 19. The belt 19 is carried upon a main drive shaft 20. This shaft extends horizontally and is supported in suitable bearings of the vertical base plates 10 and 11. Mounted upon the shaft 20 is a driving pinion 21. This pinion is in mesh with an intermediate driving gear 22 which is carried upon an intermediate shaft 23. The shaft 23 is supported in suitable bearings in plates 10 and 11. The intermediate shaft 23 is fitted with a driving pinion 24 which is in mesh with a gear 25 carried upon a cam shaft 26. The cam shaft 26 is also journaled in the base plates 10 and 11. This cam shaft operates certain mechanism to be hereinafter described and carries a disc 27 with a pin 28 which forms part of a Geneva movement, including a Geneva star wheel 29. The pin 28 engages grooves 30 in the edge of the Geneva star wheel 29 and intermittently drives a conveyor shaft 31. The conveyor shaft 31 carries conveyor chains 32 and 33 which pass around sprockets 34 and 35 which chains carry mold units 36 shown particularly in Fig. 15 of the drawings, and which units will be hereinafter described. The conveyor chains 32 and 33 are also led around sprockets 36' and 37 at the opposite end of the base plates 10 and 11 and carried upon a shaft 38. It will thus be seen that by this arrangement the conveyor chains 32 and 33 have longitudinally extending and horizontally disposed runs of chain. The uppermost run of chain supports the mold units 36 in a manner to present their open ends uppermost for purposes to be hereinafter described.

The main drive shaft 20 extends through base plate 10 and is there fitted with a worm gear 39 which is in mesh with a worm wheel 40. The worm wheel 40 is mounted upon a longitudinally extending cam shaft 41. This shaft is supported in bearings 42 and 43 carried upon the base plate 10 of the machine. At a point intermediate the worm wheel 40 and the bearing 42 a bevel gear 44 is mounted upon the shaft 41 and is in mesh with a gear 45 carried upon a transverse cam shaft 46 fitted with cams which will be hereinafter described. The shaft 41 extends beyond the end of the bearing 42 and is there provided with a miter gear 47 which is in mesh with a complementary gear 48. The gear 48 is mounted upon a transverse magazine cam shaft 49 carried in suitable bearings 50 secured at the ends of the base members 10 and 11. This shaft carries a magazine cam 51 which will be hereinafter described.

Mounted upon the opposite end of the shaft 41 and adjacent to the bearing 43 is a spreader cam 52. This cam is engaged by a roller 53 on a cam arm 54. The cam arm 54 is secured on the end of a rocker shaft 55 which extends above and parallel to the shaft 41. This rocker shaft 55 is mounted in suitable bearings 56 and 57 on the side of the base plate 10 and performs a function to be hereinafter described.

The container magazine

Figure 6:
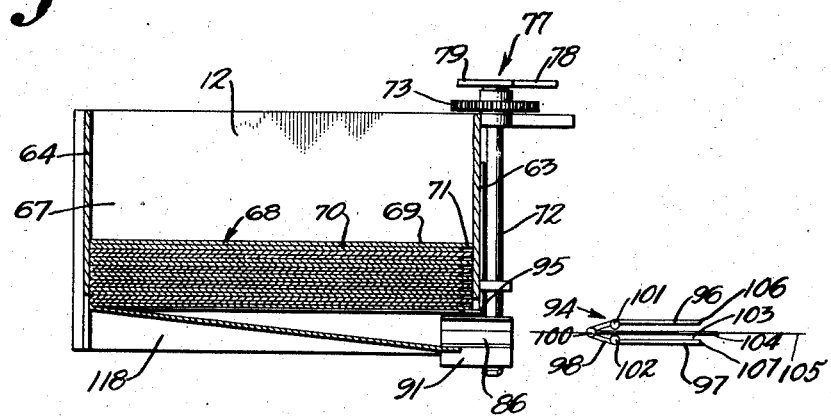
Fig. 6 is a view in vertical section as seen on the line 6—6 of Fig. 5 to disclose one of the magazines with the lowermost container having its mouth expanded and with the fragmentary portion of the expanding core indicated as moving toward the expanded mouth of the container.
Figure 14:
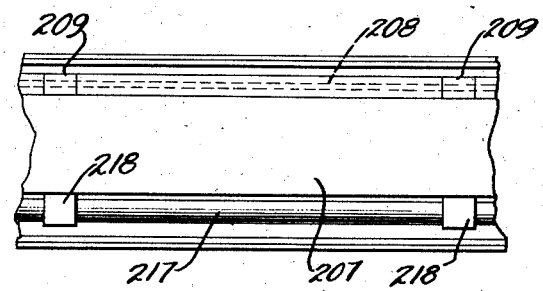
Fig. 14 is a view in horizontal section through the machine as seen on the line 14—14 of Fig. 13 and discloses an individual sealing unit and its operating mechanism.
Figure 7:
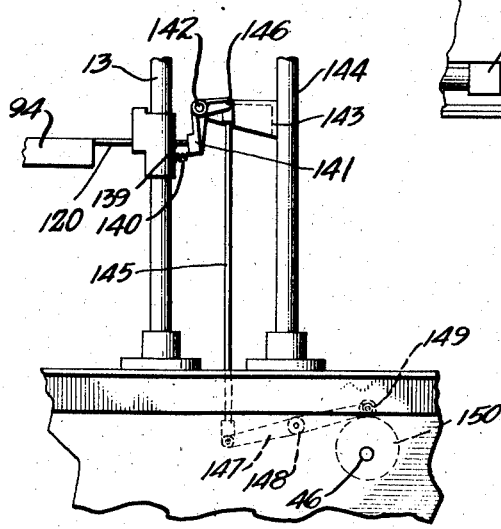
Fig. 7 is a view in vertical section and side elevation showing the operating mechanism for the expanding core.

Referring particularly to Fig. 1 it will be seen that the magazine unit 12 is disposed at the left-hand end of the machine. This unit extends transversely of the base structure and thereabove and is supported by brackets 58 and horizontal guide shafts 59 and 60. The guide shafts extend through bearings 61 and 62 which are carried at opposite ends of a frame structure of the magazine which includes front frame plates 63 and rear frame plates 64. Between these frame plates partition walls 65 and 66 are provided to form bins 67 within which a plurality of containers 68 are placed. These containers, as shown in Fig. 6 of the drawings, are made from sheets of material so that there is a fold 69 and a fold 70 which will form the opposite side walls of the container when the structure is folded, as hereinafter described. The container structure is of the type described in my previously mentioned Patent No. 2,102,716 and is here shown as formed with the uppermost wall 69 being longer than the lower wall 70 so that a lip portion 71 will be used to assist in spreading the mouth of the container to receive the expander. The container is here shown as formed by folding a sheet of material upon itself and sealing the abutting faces of the wall portions 69 and 70 together along marginal edges of the sides of the folded sheet. The container in its folded condition is shown in Fig. 16. The final package is disclosed in Fig. 17.

Figure 4:
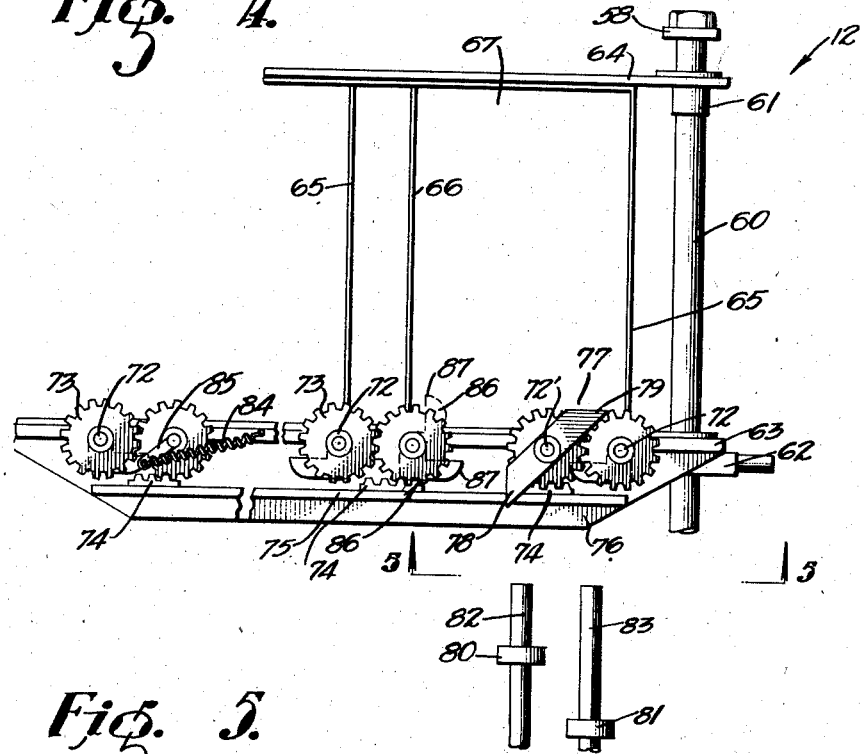
Fig. 4 is an enlarged fragmentary view in plan showing the container magazine and particularly disclosing the trip mechanism for the expanding fingers.

Extending vertically as supported by the front plate 63 of the magazine are a plurality of shafts 72. These shafts are arranged in pairs adjacent the walls 65 and 66 of the bins 67 and are geared together by pinions 73. One of each set of pairs of pinions geared together is in mesh with the teeth 74 of a gear rack. These teeth are carried upon a transversely sliding rack bar 75. The rack bar 75 slides upon a supporting plate 76. Secured to shaft 72' of one of the sets of pinions is a trip lever 77. This lever is provided with a rigid end 78 and a yieldable end 79. The true ends of the trip lever 77 are disposed in the path of trip fingers 80 and 81, respectively, which are carried upon shafts 82 and 83. These shafts overhang the top of the magazine and support the downwardly extending trip fingers, as shown in Figs. 1 and 4 of the drawings. Thus, when the magazine assembly 12 moves forwardly for a purpose to be hereinafter described the ends of the trip will engage the trip fingers 80 or 81, as the case may be, and rotate the shaft 72' a portion of a revolution to impart movement to the rack bar 75 and correspondingly rotate all of the shafts 72 and their gears 73. The gears 73 are temporarily held in either of their extreme positions by a spring 84 which is attached to the frame structure 63 at one end and to a lever 85 at its opposite end. The lever 85 is secured to one of the gear shafts 72 and when it passes over dead center the spring holds it in its extreme positions.

Figure 5:
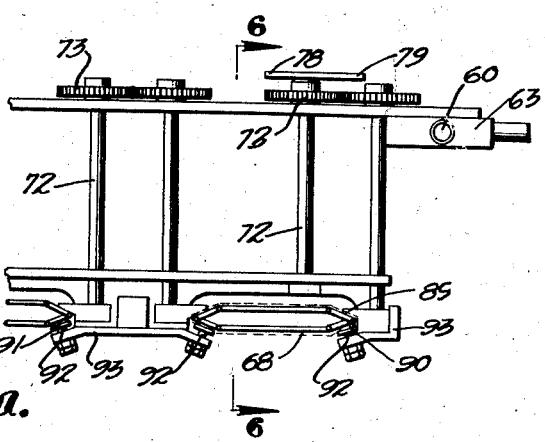
Fig. 5 is a view in elevation as seen on the line 5—5 of Fig. 4 and disclosing the magazines and the means provided for expanding the mouth of the lowermost container in the stack.
Figure 5A:
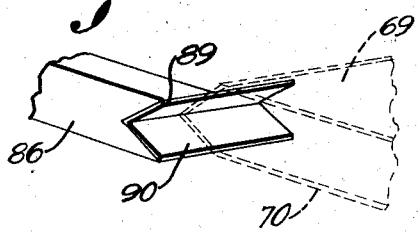
Fig. 5a is a fragmentary view in perspective showing one of the container spreader fingers.

The shafts 72 each carry a spreader finger 86. These fingers, as shown in Fig. 4 of the drawings, are angle-shaped and have a curved free end 87 so that the fingers will swing from the solid line position indicated in Fig. 4 of the drawings to the dotted line position, where they will be within the mouth of a container 68. Referring to Fig. 5a particularly it will be seen that in transverse section the finger members 86 are angular, having two lips 89 and 90 which act to spread the mouth of the container at the edges thereof and to hold the container in the dotted line position, as indicated in Fig. 5 of the drawings. When the walls of the container 68 are spread apart by the fingers 86 the lower wall 70 will be pressed against resilient pads 91 which are held on adjusting screws 92 carried by brackets 93, as particularly shown in Fig. 5 of the drawings. These pads 91 will temporarily restrain the container 68 from displacement while an expanding core 94 is moved into the slotted mouth of the container as held open by the fingers 86 at each side thereof and a lip 95 projecting inwardly from the magazine plate 63 and over which the extending portion 71 of the upper container walls 69 hangs.

*Container expanding and shaping mechanism*

When the container is positioned at the bottom of a magazine compartment in the magazine 12 with its mouth spread, as previously described, it is then in position to receive the expanding core 94 which is a part of the expander mechanism generally indicated at 13 in Fig. 1 of the drawings. The expanding cores are shaped to agree with the shape desired for the final package. The core, as here disclosed, comprises top and bottom side walls 96 and 97, respectively, closed at their forward ends by complementary end wall members 98 and 99. The end wall members are hinged together at 100 and are hinged to the forward edges of the side walls at 101 and 102. Edge wall structures comprising complementary plates 103 and 104 are hinged along a median line 105 and are hinged to the side wall plates by hinges 106 and 107. Thus, the entire expander structure can collapse to bring the opposite flat sides 96 and 97 substantially together and fold the end and edge members substantially together on their hinges. This collapsed expander structure is swung to a horizontal position and there held while the container magazine and the containers move toward it and the lowermost container, the mouth of which is spread, passes over and onto the expander while the expander stands still. The magazine 12, as previously explained, is supported upon the horizontal guide rods 59 and 60. The outermost ends of these guide rods are supported upon brackets 58. The opposite ends of the guide rods are mounted upon a cross-head 108 which is carried by vertical standards 109 and 110 secured to the base plates 10 and 11 in fittings 112. The container magazine reciprocates horizontally on the guide rods 59 and 60. This is brought about by a cam lever 113 which is mounted upon a pivot pin 114 carried by a bracket 115. The bracket 115 is secured to one of the base plates 10 or 11. The cam lever 113 is mounted to move in unison with a cam arm 116 which carries a roller 117. The roller 117 bears against the face of cam 51. This cam has been previously described as being mounted upon a transverse shaft 49 driven from the longitudinal drive shaft 41. It is designed with a suitable dwell and swell which will oscillate the lever 113 and reciprocate the container magazine in synchronism with the other operating units of the machine. The length of stroke of the container magazine is determined by the design of the cam 51 and is slightly greater than the length of the containers. This insures that when the expander moves into the opened mouth of the lowermost container 68 it will be forced entirely to the bottom of the container and will then move the container so that it will be aligned upon the expander as accommodated by the space 118 shown in Fig. 6 of the drawings, at which time the friction members 91 will yieldably hold the container to insure that the end hinge 100 has reached the bottom of the container and will then allow the container to be drawn with the expander so that the overhanging lip 71 of the container will move to a point of disengagement from the ledge 95.

The trip member 77, as previously described, engages the trip fingers 80 and 81 on the advance and retracting stroke of the container magazine 12. The supporting rods 82 and 83 are carried on a cross-head structure 119 which is vertically adjustable on the standards 109 and 110. The expander 94 is supported by a plate 120 which is secured to the upper wall section 96 of the expander. This plate is pivoted upon a shaft 121 carried by a cross-head 122. A lever arm 123 is fixed to the pivot shaft 121 and when it is moved will swing the expander 94 from horizontal to vertical positions and vice versa. The lever 123 is actuated by an oscillating lever arm 124 pivoted to the bed plate 10 by a pivot pin 125. The lever arm 124 at its free end is connected to a rod 128 which extends through it and at its lower end receives lock nuts 127. This provides a slight amount of lost motion in the rod 128 with relation to the arm 124 but insures positive movement of the rod 128 when the arm 124 swings downwardly. An extension 129 of the rod 124 carries a cam roller 132. The roller rides over the face of a cam 133. This cam is mounted upon the cam shaft 49 previously described. The cross-head 122 is intended to be vertically reciprocated by a rocker arm 134 which is pivoted to the base plate 10 upon a pivot shaft 135. At the free end of this rocker arm 134 a shackle rod 136 is provided, one end being pivoted to the arm 134 and the other to the cross-head. At a point intermediate the ends of the arm 134 a cam roller 137 is provided to ride upon the face of a rocking cam 138 which is mounted upon the intermediate shaft 46. This cam and lever arm raise the expander structures to their container receiving positions and lower the expanders with the containers to deposit them within the mold units 36 carried on the sprocket chains 32 and which will be described more particularly hereinafter.

After a container has been slipped over an expander to a position where it snugly fits and has been forced back into the magazine out of engagement with the yieldable holding means the previously collapsed expander is expanded. This structure comprises a pressure plate 139 slidable with relation to the expander and which is provided with a spring 140 acting to move the parts of the expander toward their expanded position. Pressure arms 141 are mounted upon pivot pins 142 and carried by brackets 143 on standards 144. These arms are bell cranks, the downwardly extending vertical arm of which bears against the end of a pressure plate 139, while the opposite arm of the bell crank is secured to a vertical rod 145 by a pin 146. The rod 145 extends downwardly and is pivotally secured to a cam lever 147 which is mounted intermediate its ends upon a shaft 148 carried by the base plate structure. The opposite free end of this lever carries a cam roller 149 riding on a cam 150. The cam 150 is secured upon the drive shaft 46 previously described as being driven by the longitudinal shaft 41. When the levers force against the ends of the pressure plates 139 the expanding devices 94 are collapsed and are thus held while the containers are being positioned over them. When the levers 141 rock they relieve pressure on the ends of the pressure plates 139 and permit the springs 140 to expand the expanders. This will give the container a shape substantially of rectangular cross-section. It is to be understood, however, that the developed length as represented by the wall of the container encircling the expander is somewhat greater than the same section of the expander so that the container will readily slip off of the expander when the container and expander have been withdrawn from the magazine. Thus, when the expander with the container have been swung to a vertical position beneath the pivot shaft 121 the container will fall from the expander and into a mold pocket 151, which mold pockets form a part of the mold structure 36.

When the expander 94 with a container 68 thereupon moves from its horizontal position to its vertical position it swings along a folding guide 152. This guide is particularly shown in Figs. 8, 9 and 20, and comprises a pair of guide rails 153 and 154 which substantially represent the width of the finally folded container. These guide rails represent approximately one-fourth of a circle in arcuate length and are spaced with their sides parallel and vertical. A bottom rail 155 is disposed between the side rails but out of contact therewith. The width of the bottom rail along the entering portion of the guide is less than the width at the discharge end, as shown by comparison of the sections disclosed in Figs. 9 and 20 of the drawings. Here it will be seen that the bottom guide 155 cooperates with the side guides 153 and 154 to form throats 156 and 157 into which the partially formed bottom corners of the package extend, and that at the discharge end of the bottom guide 155 flanges 158 and 159 extend on the outside of the guide plates 153 and 154 to fold the corners upwardly and toward a position where they will be folded back on the body of the formed container. The guide plates 153 and 154 will also act to fold the sealed side seams over on the edges of the container as the expander with the container thereon moves to a position to swing free of the lower end of the guide structure 152.

The mold units

Figure 13:
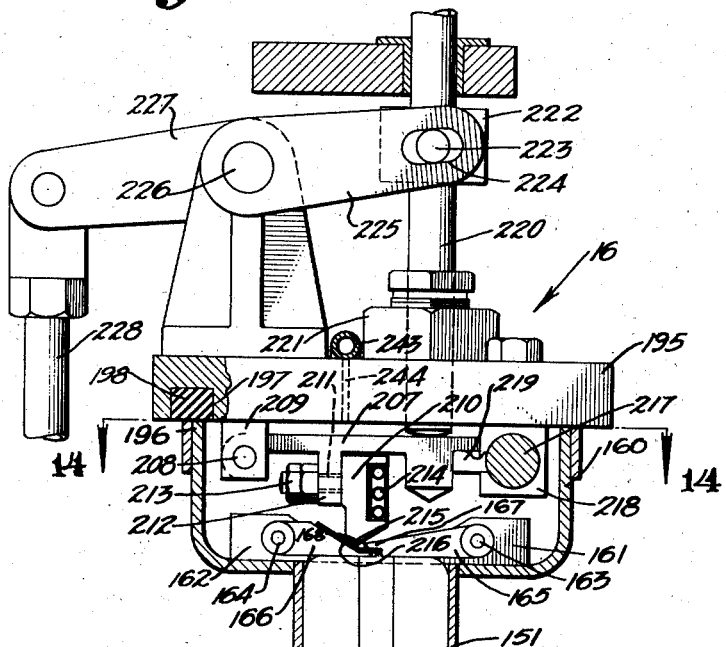
Fig. 13 is a view in vertical section through the package mold, the folding, sealing and vacuumizing means at the sealing station.
Figure 19:
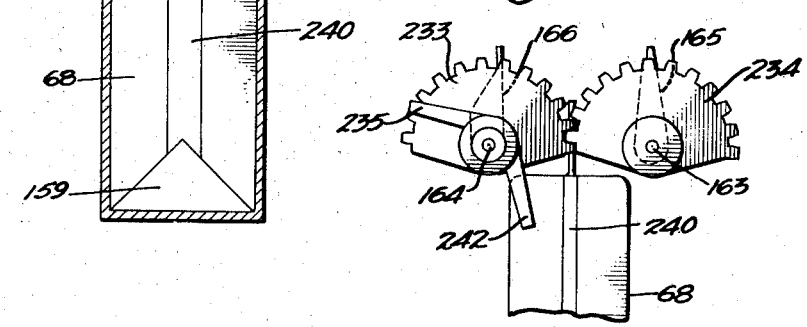
Fig. 19 is a fragmentary view showing the folding fingers in their unfolded positions.

As previously described, the mold units 36 extend transversely of the machine and are supported on traveling chains 32 and 33 driven by sprockets 34 and 35. These units comprise an upper pan structure 160 formed with openings in its floor and through which the mold pockets 151 are supported. The mold pockets are of a size slightly in excess of the finished package produced when the container 68 is filled, as will be hereinafter described. In the pan section 160 bearings 161 and 162 are provided which rotatably support shafts 163 and 164, respectively. Mounted on these shafts are folding fingers 165 and 166. By reference to Fig. 13 of the drawings it will be seen that the fingers 165 and 166 fold to an overlapping position when the package is to be sealed and that the finger 165 has an overhanging portion 167 which folds down over a projecting portion 168 on the finger 166. The operation and uses of this structure will be hereinafter described. At the present it is sufficient to state that when the empty container slips from the expander into a mold pocket 151 the fingers 165 and 166 are in their vertical positions, as shown in Fig. 19 of the drawings, and at a subsequent point in the travel of the mold units the fingers swing to the position shown in Fig. 13 of the drawings. The empty containers, after being deposited in the mold pockets 151, are then carried by the conveyor chains 32 and 33 to the filling station 14.

The container filling unit

The filling structure is shown in Figs. 1 and 10 of the drawings. Here it will be seen that an upright frame 169 is mounted upon the base plates 10 and 11 and at its upper end supports a bin 170 containing the product which is to be placed in the packages. Disposed beneath the bin 170 and controlled by suitable mechanism is a scoop 171 within which the product is delivered from the bin and by which it is weighed. The weighed product is then delivered to a discharge spout 172 and into a telescoping chute 173. The telescoping chute is vertically slidable and is provided with a supporting lug 173' attached to an oscillating arm 174. This arm is mounted upon a pivot 175 carried by brackets 176 on standards 177. The end of the lever 174 which projects beyond the pivot 175 engages a pin 178 secured to a connecting rod 179. This rod is attached at its lower end to one arm by a cam lever 180. The cam lever 180 is mounted upon a pivot 181 and carries a cam roller 182 at its free end. The roller 182 rolls upon the circumferential edge of a cam 183. This cam is mounted on the transverse shaft 46. The timing of the cam is such as to insure that the telescoping chute will quickly enter the mouth of the container when it is placed thereunder by the mold unit, and as filling takes place the chute will gradually withdraw from the container, thereby facilitating in packing the contents of the container. During this filling and withdrawing movement the molds are being vibrated by suitable vibrating mechanism which tends to cause the material to settle and pack within the container.

The container spreading unit

When the container has been filled at the filling station 14 the next intermittent movement of the conveyor chains will bring the filled mold unit to the container spreading unit. This mechanism acts to engage the mouth of the container at its opposite seamed edges and to spread the mouth so that in a subsequent operation a continuous seam may be formed entirely across the width of the container and in an unbroken seam along the mouth of the container. The structure comprises a transversely extending supporting frame 184 upon which a plurality of spur gear pinions 185 are supported. These pinions stand with their axes parallel and horizontal and engage the teeth 186 of a transversely extending gear rack 187. The gear rack 187 is connected to an operating arm 188 which is mounted upon the shaft 55 previously described. This shaft carries a cam lever arm 54 upon which a cam roller 53 is supported. The cam roller 53 rests upon the surface of a cam element 52 which is secured upon the end of the longitudinally extending drive shaft 41. A spring 189 acts to urge the operating lever 188 outwardly and to move the gear rack 187 in the direction of the arrow a, as shown in Fig. 11. The gear rack, being in mesh with the pinions 185, rotates these pinions. The pinions 185 are in pairs and engage spreading bars 190 and 191. These bars are supported upon the frame structure 184 to cross each other and have rack portions 192 which engage the pinions 185 and make it possible for the spreading bars to simultaneously reciprocate when the rack bar 187 moves. By reference to Fig. 1 the bars are disclosed in solid lines as being in their projected positions and are indicated by dotted lines as being in their retracted positions. By this arrangement it will be seen that when the spreading bars are in their projected positions within the mouth of the container they will engage the opposite edge walls of the container at the point of the seams and will spread the mouth of the container lengthwise of the opening so that the portion of the container projecting above the mold pocket 151 will be flattened out preparatory to the final seaming and closing operation.

The vacuum sealing unit

The vacuum sealing unit generally indicated at 16 in Fig. 1 of the drawings comprises a pair of uprights 193 and 194 upon which a sealing head structure 195 is mounted to vertically reciprocate. This head structure is designed to fit over the top of the pan portion 160 of the mold units and to form a seal with the marginal lip 196 thereof. The marginal lip is formed with a groove 197 in its under face which carries a packing gasket 198. The packing gasket 198 rests directly upon the lip 196 and forms a vacuum seal therewith when the sealing head structure 195 rests firmly upon the lip 196 of a mold unit 36. The sealing head structure is provided with connecting links 199 pivotally connected to the head structure at 200 and also connected to a lever 201 at 202. The lever 201 is pivoted to the frame on a pin 203 and carries a cam roller 204 at a point intermediate its length. This cam roller engages the edge of a cam 205 which is mounted on the shaft 26 and by which the sealing head structure 195 is given power to lift and lower intermittently.

The sealing head structure 195 carries a plurality of sealing levers 207. These extend horizontally beneath the head and are mounted upon pivot pins 208 which are held by lugs 209 on the under face of the head. Each of the levers 207 is fitted with a pressure element 210 which extends horizontally and longitudinally out of the head. The pressure element is provided with a pin 211 which extends through a downwardly projecting lug 212 carried by the lever 207. Nuts 213 engage the pin and hold it in position. The nuts are set so that the pressure element 210 is free to oscillate on the pin in a vertical plane, and thus adjust itself, for a purpose to be hereinafter described.

One vertical face of the pressure element 210 is recessed to receive an electric heating element 214. The lower edge of the pressure element 210 has an inclined pressure face 215 which imparts heat and pressure to the collapsed mouth of the container and heat-seals the container closed in cooperation with the inclined face 216 of the finger 166.

Prior to the heat-sealing action it is necessary to produce a vacuum action, and for that purpose the pressure of the pressure element 210 is relieved from the mouth of the container. This is accomplished by a shaft 217 which is rotatably supported in bearings 218 on the bottom of the sealing head 195 and carries lifting detents 219 which fit beneath the free ends of the levers 207 and act to lift these free ends slightly during the vacuum action, after which the lifting operation is relieved and the pressure rods 220 move downwardly through the stuffing boxes 221 to exert the desired force for sealing. The pressure rods 220 carry collars 222 provided with pins 223 which extend into slotted openings 224 in a lever 225. The lever 225, or a plurality of such levers, are mounted upon a rock shaft 226 having an arm 227 engaged by a shackle 228. The shackle 228 extends to a cam lever 229 pivoted at 230 on the base plate of the structure. This lever carries a roller 231 which acts upon a cam 232 to operate the lever.

In cooperation with the operation of the seaming head the folding fingers move to folded and unfolded positions. This is brought about due to the fact that the shafts 163 and 164 carrying the fingers are also supplied with gear segments 233 and 234, respectively. These segments cause the fingers to swing in unison. The shafts are fitted with trip members 235 which engage tripping elements 236 and 237 along the path of travel of a mold unit to the vacuum station and away from the vacuum station. When in engagement with trip 236 the fingers fold together. When in engagement with trip 237 they swing apart.

Figure 2:
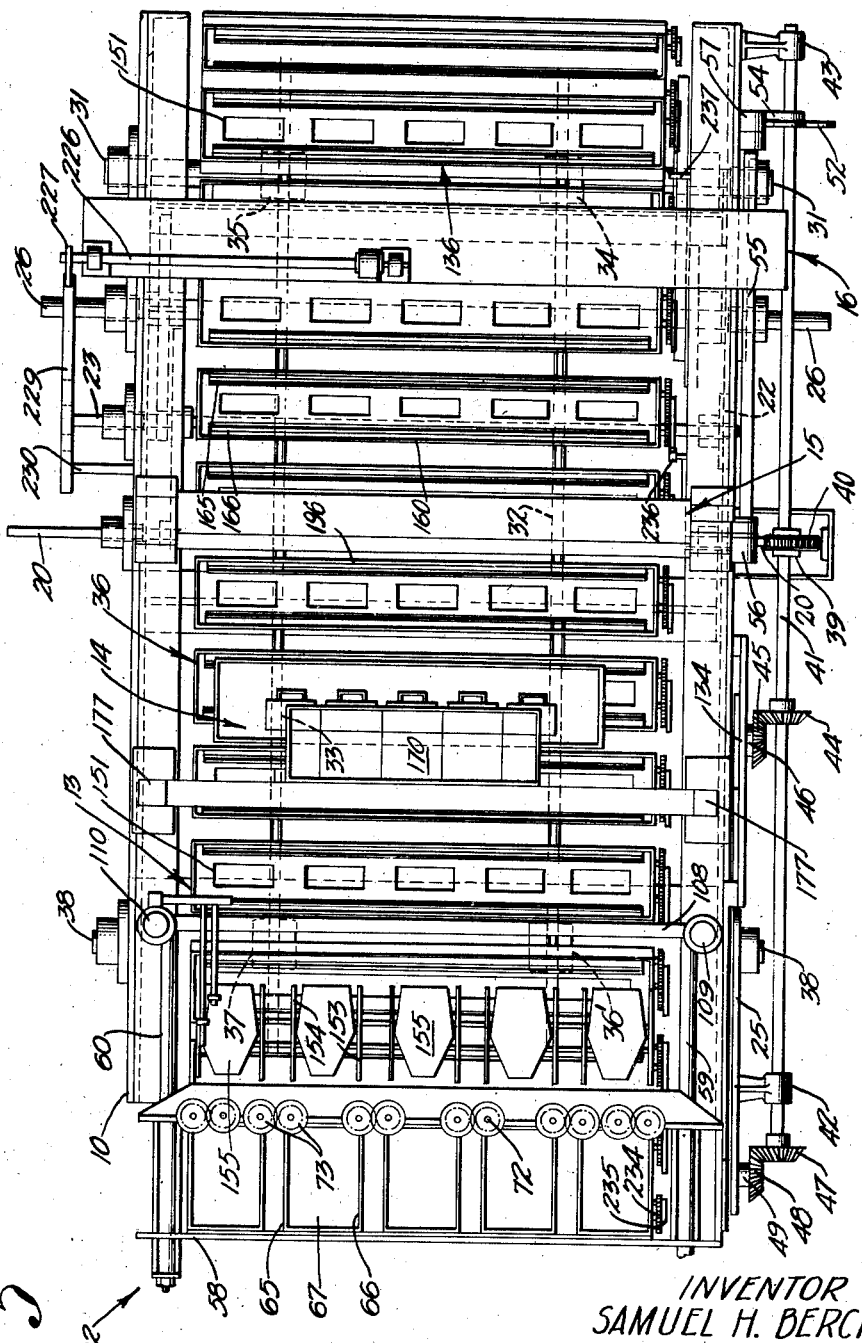
Fig. 2 is a view in plan showing the complete assembly.
Figure 3:
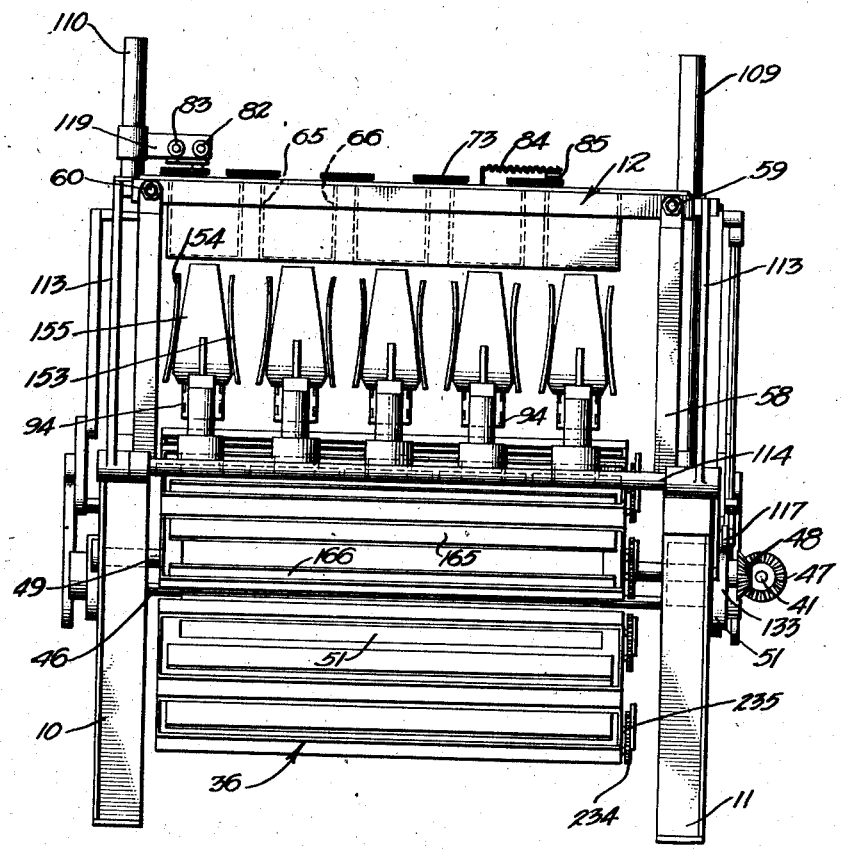
Fig. 3 is a view in end elevation showing the magazine end of the machine as seen in the direction of the arrow 3 in Fig. 1.

In operation of the present invention the machine is assembled as shown particularly in Figs. 1 and 2 of the drawings. When thus assembled the machine is driven by a motor 17. This imparts rotation to a main drive shaft 20 through a belt 19. The shaft 20 imparts motion through the gear chains previously described to the various transverse shafts 23 and 26 which thus drive continuously. The shaft 26 carries the disc 27 and pin 28 of a Geneva movement which includes the star wheel 29 mounted upon the conveyor shaft 31 and by which the conveyor shaft 31 is intermittently driven. By this arrangement the conveyor chains 32 and 33 are intermittently moved with the mold units 36 so that these units will successfully move and stop at the container receiving station in register with the expander unit 13, at the filling station beneath the filling structure 14, at the container mouth spreading station beneath the spreader 15, and at the vacuum sealing station 16.

The longitudinally extending shaft 41 is continuously driven off the main shaft and thus places all of the cams carried by the longitudinal shaft 41 and the shafts driven therefrom in continuous rotation. Heretofore, the different units have been described as single units. It is to be understood, however, that the machine may be of any desired width as output is required, and that by way of example the mold units 36 each carry 5 mold pockets 151 spaced from each other transversely of the machine and suspended from a pan 160. It will therefore be understood that the magazine unit 12 is formed with five magazine compartments, that the expander structure 13 with its guide rails is provided with five expander units, that there are five sections to the feed mechanism, as well as five spreading units and a vacuum closing head which accommodates five mold pockets 151.

The containers are placed within the separate container compartments and are urged forwardly against the front wall 63 of the magazine frame. These containers are disposed so that the lowermost container rests partially on the floor of the magazine and that its overhanging end 71 engages a lip 95 to assume a spread position at the mouth of the container 68, as shown in Fig. 6 of the drawings. When in this condition the magazine 12 is retracted on the guide shafts 59 and 60 and an expanding unit 13 is elevated on the cross-head 122 of the cam shaft 135. At the same time the expanders 94 are swung from the solid line position shown in Fig. 1 to the dotted line position, and when the expanders are horizontally disposed with relation to their pivot 121 the levers 141 press against the ends of the plates 139 to force the expander to a contracted position against the tension of spring 140. The cam 51 then acts upon the cam lever structure 113 and 116 to impart horizontal motion to the magazine unit 12. This will cause each of the magazine units to be moved over the expanding units 94 so that the lowermost container 68 will be slipped over a corresponding expander. As this movement begins the portion 78 of the trip lever 77 will encounter the stop 80 on the supporting rod 82 and will rotate the shaft 72' until it passes dead-center, at which time the spring 84 connected to the lever 85 will swing over dead-center and swing the lever 85 to its extreme position. This particular movement will swing the spreading fingers 86 from the solid line position indicated in Fig. 4 of the drawings to the dotted line position, with the result that the flaring lips 89 and 90 of the fingers will pass into the open mouth of the container and spread the container so that its walls 69 and 70 will be stretched substantially parallel and the opening will be sufficient to permit the end of the expander to be readily introduced thereinto.

As the magazine continues to move forwardly and to carry each container 68 over and around an expanding unit the yieldable detent at the end of the lever section 79 of the trip member 77 will swing clear of the stop 81 on the bar 83 but will be in an obstructing position on the return stroke. When the container has been drawn over an expander until the protruding point of the expander reaches the end of the container further movement of the magazine in the direction of the expander will cause the container to pull away from the yieldable holding member 74 and will cause the overhanging lip 71 of the upper wall of the container to move clear from the ledge 95. At this time the bell crank levers 141 will swing away from a position of pressure against the ends of the plates 139 and the springs 140 connected with each expander structure will then act to cause the expander to spread to its rectangular sectional form within the container. The magazine 12 is then retracted to its original position while the expanders stand horizontally. When the magazine has been retracted to the full length of its stroke each expander will be in a horizontal position with a container upon it. The lever arm 124 swings as actuated by the cam lever 129 and the cam 130 so that the expander with the container thereon will swing downwardly from a horizontal to a vertical position. During this operation the end of the container will be flattened as shown in Fig. 9 of the drawings and is indicated at 238. The pointed corners indicated at 239 will project through the throats 156 while the sides of the container are being folded so that the edge seamed portions 240 will be folded against the side of the edge wall of the container. As the expander and the container continue to travel along the guide floor 155 and between the side guides 153 and 154 they will reach a position shown in Fig. 20 of the drawings where it will be seen that the corners 239 will be folded upwardly along the outsides of the guide plates 154 and 153 by the projecting lips 159 carried by the plate 155. Thus, the corner points will be conditioned to fold directly against the edge walls of the container in the finally formed package indicated in Fig. 19 of the drawings. When this position is reached and the expander stands vertically and dependent from its pivot the container will fall from the expander and into an appropriate mold pocket 151. If necessary, a jet of air may be provided to blow the container off of the expander and to discharge it into the mold pocket (although the structure is not shown in the drawings). This is done as cam 138 acts through the lever 134, the connecting rod 136 and the cross-head 122 to bodily lower the set of expander units with the containers thereon. After the containers have been deposited in the set of mold pockets of a mold unit 36 the intermittent drive will advance the mold unit 36 toward the filling station and will position a mold unit with an empty set of containers in register with the chutes 173. These chutes are then lowered into the containers and the mold through the action of cam 183, lever arm 180 and the arm 174 connected to the telescoping chute. A suitable timing mechanism feeds material from the storage bin 170 through the weighing structure 171 and then through the chutes to the various containers. As the filling progresses the cam and lever structure elevates the chute and gradually withdraws it from the container. The intermittent motion then moves the mold units 36 consecutively to the spreader unit 15. Here the cam 52 acts through the lever arm 54 and the shaft 55 to operate the transversely extending rack bar 187. As this takes place the spreading bars 190 and 191 move downwardly and at right angles to each other into the open mouth of the container. They then engage the inner face of the edge walls of the container adjacent the point at which the seams 240 occur and spread the upper portion of the mouth of the container as indicated at 241 in Fig. 11 of the drawings. When this operation has been completed the mouth of the container will retain a substantially permanent set with the inner faces of the container walls 69 and 70 abutting against each other. It is to be understood that preferably the inner walls are as described in the aforementioned patent of applicant and are formed with abutting laminae of "Pliofilm" which will heat-seal. The relief of pressure of the cam 52 will cause the spring 189 to swing the arm 188 outwardly and move the rack bar 187 to retract the spreading fingers 190 and 191. The intermittent motion then moves the mold unit 36 to the vacuum sealing station, during which time a trip lever 242 carried by shaft 163 or shaft 164 engages the trip member 236 disposed along the path of travel of the mold unit so that the folding fingers 165 and 166 will swing down from the position shown in Fig. 21 of the drawings to the overlapping position shown in Fig. 13. This will cause the upper mouth portion 241 to be folded between the ends of the fingers and to lie along the inclined face 216 of the finger 166. The seaming head 195 is then moved downwardly to its seaming position and the pressure element 210 is forced downwardly against the folded mouth portion 241. Heat is supplied to the element 210 by the heating element 214 which is connected with a source of electrical supply not shown in the drawings. Prior to the application of the pressure element in a sealing action the shaft 217 is rotated to swing the member 219 upwardly and temporarily lift the free end of the supporting lever 207. At this time suction is applied to the sealed mold through a suction pipe 243 which communicates with ducts 244 through the seaming head 195. Prior to sealing the container it may be desirable to direct a jet of air against the meeting surfaces of the container to blow away dust or other extraneous material. The suction pipe 243 is connected with a suitable source of suction, such for example as a vacuum pump, and causes the air to be evacuated from around and within the mass of the product with which the container is filled, and also creates a desired condition of negative pressure within the container. It will also be seen that at this time the pan and the mold pockets 151 will be under the same condition of partial vacuum as exists within the container. The member 219 then moves downwardly to permit the pressure element 210 to be forced against the flap portion 241 and to heat-seal this portion in a continuous seam extending throughout the width of the container. After this operation has been completed the cam lever 201 is actuated by the cam 205 to lift the seaming head 195 from its sealing position upon the pan 160 of the mold unit 36. When the seal is broken between the head 195 and the pan of the mold unit 36 a condition of atmospheric pressure will be re-established within the mold unit and the pockets 151 and around the sealed container therein. This uniform atmospheric pressure against the side walls of the container will cause the container to be molded into a shape agreeing with the configuration of the side walls and the material of the container will be compacted so that a final firm and hard package will be made even though the material with which the package was filled is normally loose and powdered or granular, this feature of the invention being previously disclosed in my co-pending application Serial No. 210,038. The mold unit 36 may then be advanced toward the end of the upper run of the conveyor and in so doing the trip lever 242 will engage the trip stop 237 to swing the folding fingers 165 and 166 to the position shown in Fig. 21 of the drawings and thus prepare them for a new cycle of operation as the mold units 36 travel along the lower run of the conveyor chain to the station where they receive other containers from the expanders 94. When the mold units pass beneath the sprockets 29 the mold units will be inverted so that the finished packages may fall from the mold pockets to be delivered to the labeling or packing machine.

It will thus be seen that the invention here disclosed comprises a compact design for a full automatic machine which receives unfilled flexible containers and shapes these containers into final package form, thereafter filling the containers, folding and sealing the same, thus insuring that various products including food products, and particularly coffee, may be rapidly placed in inexpensive containers and vacuum sealed so that the contents of the containers will be preserved against contamination or deterioration.

While I have shown the preferred form of my invention as now known to me, it will be understood that various changes may be made in combination, construction and arrangement of parts by those skilled in the art without departing from the spirit of my invention as claimed.

Having thus described my invention, what I claim and desire to secure by Letters Patent is:

1. In a packaging device of the character described in which bag-like flexible containers having closed sides and a closed end are shaped, filled and sealed, forming means comprising a magazine within which said containers are disposed in a collapsed condition, means as a part of said magazine for spreading the mouth of the lowermost container in the magazine, expanding means adapted to be introduced into the magazine in a normally collapsed condition, cooperating means producing relative movement between the container and the expander whereby the expander will be positioned within the container, means acting to expand the expander while so positioned, whereby the container will be given the general shape of the final package, and folding means cooperating with the expander to fold the sides and the closed end of the container to give the package shape.

2. Same as claim 1, adding the following: . . . a mold unit in which said shaped container is deposited and means for moving the expander and the container thereon to register with said mold unit, whereby the container will be deposited therein.

3. In a packaging device of the character described in which bag-like flexible containers are shaped, filled and sealed, forming means comprising a magazine within which said containers are disposed in a collapsed condition, means as a part of said magazine for spreading the mouth of the lowermost container in the magazine, expanding means adapted to be introduced into the magazine in a normally collapsed condition, cooperating means producing relative movement between the container and the expander whereby the expander will be positioned within the container, means acting to expand the expander while so positioned whereby the container will be given the general shape of the final package, folding means cooperating with the expander to fold the sides and close the end of the container to give the package shape, a mold unit in which said shaped container is deposited, means for moving the expander and the container thereon to register with said mold unit whereby the container will be deposited therein, and a traveling conveyor carrying the mold unit to and from its point of register with the expander.

4. In apparatus of the character described and within which normally flat bag-like containers are handled, a magazine for carrying a stack of said containers and holding the lowermost container in a position to be extracted from the magazine, an expander pivoted to swing in a vertical plane from a position in alignment with the lower container in the magazine to a lower vertical position, a folding member along the path of travel of the expander whereby the bottom end and sides of a container may be folded to a desired shape as the expander travels from its horizontal position to its vertical position, means for swinging the expander from its vertical position to its horizontal position and in return, means for reciprocating the magazine whereby the lowermost container therein will be moved onto the expander, and means for expanding the expander with the container thereon and synchronous driving means for the various operating units.

5. A bag expanding structure within which normally flat bag-like containers are handled, a magazine receiving a vertical stack of containers and supporting the same in a manner to permit the withdrawal of the lowermost container, spreading fingers adapted to swing into the mouth of the lowermost container to spread the same, a collapsible expanding unit adapted to swing toward and away from positions of alignment with the lowermost container in the magazine, means collapsing the expanding unit, a supporting structure for the magazine and along which it may travel horizontally to position the container in a bracing position over the expander, said collapsing means being capable of releasing the expander to permit it to expand within the container and give shape to the same, means acting to swing the spreading fingers out of the mouth of the container while permitting the expander to enter the same, forming guides adjacent to the magazine and along which the expander and the container disposed thereon may pass as the end and sides of the container are folded and shaped by the cooperating action of the expander and the forming guides, means for reciprocating the magazine, means for oscillating the expander, means for actuating the device for causing the collapse and expansion of the expander, means for swinging the spreading fingers to and from their spreading positions, and synchronous operating means for said various driving devices.

SAMUEL H. BERCH.